(12) United States Patent
Gheorghiu et al.

(10) Patent No.: US 10,470,200 B2
(45) Date of Patent: Nov. 5, 2019

(54) LOW COMPLEXITY HIGHER ORDER MIMO

(71) Applicant: QUALCOMM Incorporated, San Diego, CA (US)

(72) Inventors: Valentin Alexandru Gheorghiu, Tokyo (JP); Sumit Verma, San Diego, CA (US); Udara Fernando, San Diego, CA (US); Timo Ville Vintola, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 210 days.

(21) Appl. No.: 15/622,877

(22) Filed: Jun. 14, 2017

(65) Prior Publication Data

US 2018/0049215 A1 Feb. 15, 2018

Related U.S. Application Data

(60) Provisional application No. 62/374,389, filed on Aug. 12, 2016, provisional application No. 62/350,742, filed on Jun. 16, 2016.

(51) Int. Cl.
*H04W 4/00* (2018.01)
*H04W 72/12* (2009.01)
(Continued)

(52) U.S. Cl.
CPC ...... *H04W 72/1231* (2013.01); *H04B 7/0417* (2013.01); *H04B 7/0628* (2013.01);
(Continued)

(58) Field of Classification Search
None
See application file for complete search history.

(56) References Cited

U.S. PATENT DOCUMENTS

2006/0099985 A1* 5/2006 Whinnett ............ H04W 52/282
455/522
2012/0188951 A1* 7/2012 He ..................... H04L 25/03866
370/329

(Continued)

FOREIGN PATENT DOCUMENTS

WO WO-2015148997 A1 10/2015
WO WO-2015172041 A1 11/2015

OTHER PUBLICATIONS

International Search Report and Written Opinion—PCT/US2017/037689—ISA/EPO—dated Sep. 29, 2017.

*Primary Examiner* — Bob A Phunkulh
(74) *Attorney, Agent, or Firm* — Liem T. Do

(57) ABSTRACT

Low complexity, high order multiple input, multiple output (MIMO) operations are described in which a user equipment (UE), configured with at least one normal performance receiver chain and at least one low-performance, low-complexity diversity receiver chain, signals a capabilities indicator identifying existence of the low-performance diversity receivers. Using the UEs capabilities, a serving base station may schedule uplink and downlink transmissions for the UE to reduce uplink-downlink collisions below a minimum threshold number. The serving base station may also take UE transmit power into consideration for signaling power control or modulation and coding schemes in order to minimize potential interference cause by UE transmissions. For channel state feedback, the UE may provide different channel feedback for uplink-downlink collision subframes and non-collision subframes.

26 Claims, 9 Drawing Sheets

(51) Int. Cl.
*H04W 72/04* (2009.01)
*H04B 7/0417* (2017.01)
*H04L 5/00* (2006.01)
*H04W 52/14* (2009.01)
*H04B 7/06* (2006.01)
*H04W 52/36* (2009.01)
*H04B 7/0452* (2017.01)

(52) U.S. Cl.
CPC ......... *H04L 5/0053* (2013.01); *H04W 52/146* (2013.01); *H04W 72/048* (2013.01); *H04B 7/0452* (2013.01); *H04W 52/365* (2013.01)

(56) References Cited

U.S. PATENT DOCUMENTS

| | | | | |
|---|---|---|---|---|
| 2014/0235256 | A1* | 8/2014 | Takeda | H04W 52/0216 455/450 |
| 2015/0016310 | A1* | 1/2015 | Yi | H04B 7/2615 370/277 |
| 2015/0181560 | A1* | 6/2015 | Jamadagni | H04B 7/2621 370/329 |
| 2015/0181576 | A1* | 6/2015 | Papasakellariou | H04L 5/0053 370/329 |
| 2015/0326381 | A1* | 11/2015 | Sakhnini | H04L 5/16 370/281 |
| 2016/0205495 | A1* | 7/2016 | Hu | H04W 4/70 370/331 |
| 2016/0270028 | A1* | 9/2016 | Lee | H04W 68/02 |
| 2017/0034850 | A1* | 2/2017 | Rico Alvarino | H04W 4/70 |
| 2017/0048756 | A1* | 2/2017 | Sunell | H04W 8/24 |
| 2017/0055250 | A1* | 2/2017 | Lim | H04L 5/0053 |
| 2017/0086165 | A1* | 3/2017 | Tarradell | H04W 4/00 |
| 2017/0230935 | A1* | 8/2017 | Xu | H04W 36/08 |
| 2018/0013526 | A1* | 1/2018 | Bayesteh | H04L 5/0007 |
| 2018/0115943 | A1* | 4/2018 | Park | H04W 68/00 |
| 2018/0152822 | A1* | 5/2018 | Lee | H04W 48/12 |
| 2018/0254851 | A1* | 9/2018 | Roessel | H04L 1/009 |

* cited by examiner

LOW COMPLEXITY HIGHER ORDER MIMO

CROSS-REFERENCE TO RELATED APPLICATIONS

This application claims the benefit of U.S. Provisional Patent Application No. 62/374,389, entitled, "LOW COMPLEXITY HIGHER ORDER MIMO," filed on Aug. 12, 2016, and U.S. Provisional Patent Application No. 62/350,742, entitled, "MULTIPLE INPUT MULTIPLE OUTPUT (MIMO) RECEIVER HAVING FILTER-LESS RECEIVE CHAIN," filed on Jun. 16, 2016, which is expressly incorporated by reference herein in its entirety.

BACKGROUND

Field

Aspects of the present disclosure relate generally to wireless communication systems, and more particularly, to low complexity receiving in higher order multiple input, multiple output systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving from at least one served UE a capabilities indicator identifying the at least one served UE having one or more low-complexity diversity receivers, and scheduling uplink and downlink transmissions for the at least one UE to reduce uplink-downlink collisions below a minimum threshold number, wherein the scheduling is performed in response to the capabilities indicator.

In an additional aspect of the disclosure, an apparatus configured for wireless communication includes means for receiving from at least one served UE a capabilities indicator identifying the at least one served UE having one or more low-complexity diversity receivers, and means for scheduling uplink and downlink transmissions for the at least one UE to reduce uplink-downlink collisions below a minimum threshold number, wherein the scheduling is performed in response to the capabilities indicator.

In an additional aspect of the disclosure, a non-transitory computer-readable medium having program code recorded thereon. The program code further includes code to receive from at least one served UE a capabilities indicator identifying the at least one served UE having one or more low-complexity diversity receivers, and code to schedule uplink and downlink transmissions for the at least one UE to reduce uplink-downlink collisions below a minimum threshold number, wherein the scheduling is performed in response to the capabilities indicator.

In an additional aspect of the disclosure, an apparatus configured for wireless communication is disclosed. The apparatus includes at least one processor, and a memory coupled to the processor. The processor is configured to receive from at least one served UE a capabilities indicator identifying the at least one served UE having one or more low complexity diversity receivers, and to schedule uplink and downlink transmissions for the at least one UE to reduce uplink-downlink collisions below a minimum threshold number, wherein the scheduling is performed in response to the capabilities indicator.

In one aspect of the disclosure, a method of wireless communication includes transmitting a capabilities indicator by a UE to a serving base station, wherein the capabilities indicator identifies the UE as having one or more low-complexity diversity receivers, and receiving transmission and power scheduling controls from the serving base station based on the capabilities indicator to reduce uplink-downlink collisions below a minimum threshold number.

In an additional aspect of the disclosure, an apparatus configured for wireless communication includes means for transmitting a capabilities indicator by a UE to a serving base station, wherein the capabilities indicator identifies the UE as having one or more low-complexity diversity receivers, and means for receiving transmission and power scheduling controls from the serving base station based on the capabilities indicator to reduce uplink-downlink collisions below a minimum threshold number.

In an additional aspect of the disclosure, a non-transitory computer-readable medium having program code recorded thereon. The program code further includes code to transmit a capabilities indicator by a UE to a serving base station, wherein the capabilities indicator identifies the UE as having one or more low-complexity diversity receivers, and code to receive transmission and power scheduling controls from the serving base station based on the capabilities indicator to reduce uplink-downlink collisions below a minimum threshold number.

In an additional aspect of the disclosure, an apparatus configured for wireless communication is disclosed. The apparatus includes at least one processor, and a memory coupled to the processor. The processor is configured to transmit a capabilities indicator by a UE to a serving base station, wherein the capabilities indicator identifies the UE as having one or more low-complexity diversity receivers, and to receive transmission and power scheduling controls from the serving base station based on the capabilities indicator to reduce uplink-downlink collisions below a minimum threshold number.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
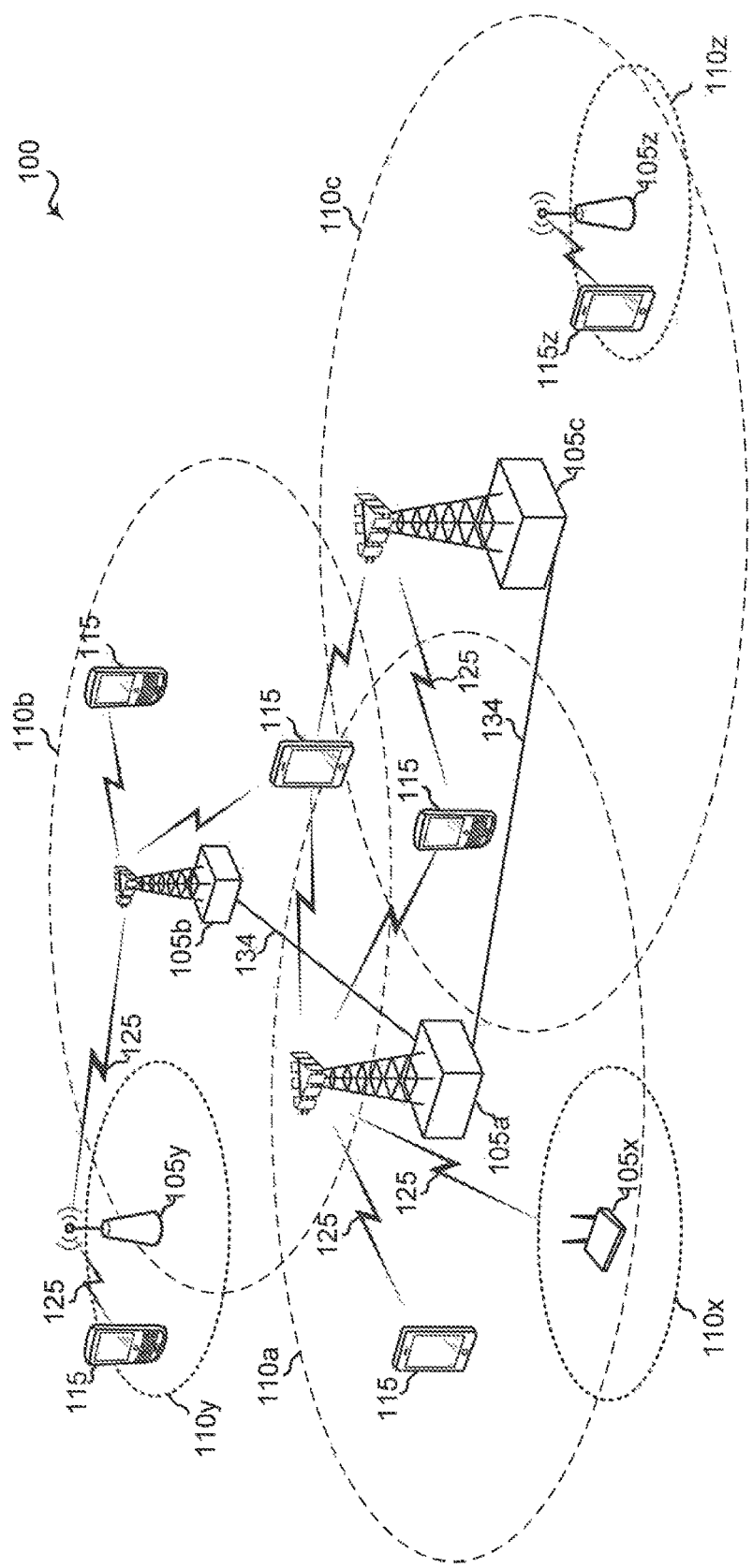
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a. GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RAT) and radio access networks (RANs).

An OFDMA network may implement a radio technology such as evolved. UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pica cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB, eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UP may be stationary or mobile. A UP may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UP may be able to communicate with macro eNBs, pico eNBs, femto eNBs, relays, and the like, in FIG. 1, a lightning bolt (e.g., communication links 125) indicates wireless transmissions between a UP and a serving eNB, which is an eNB designated to serve the UP on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
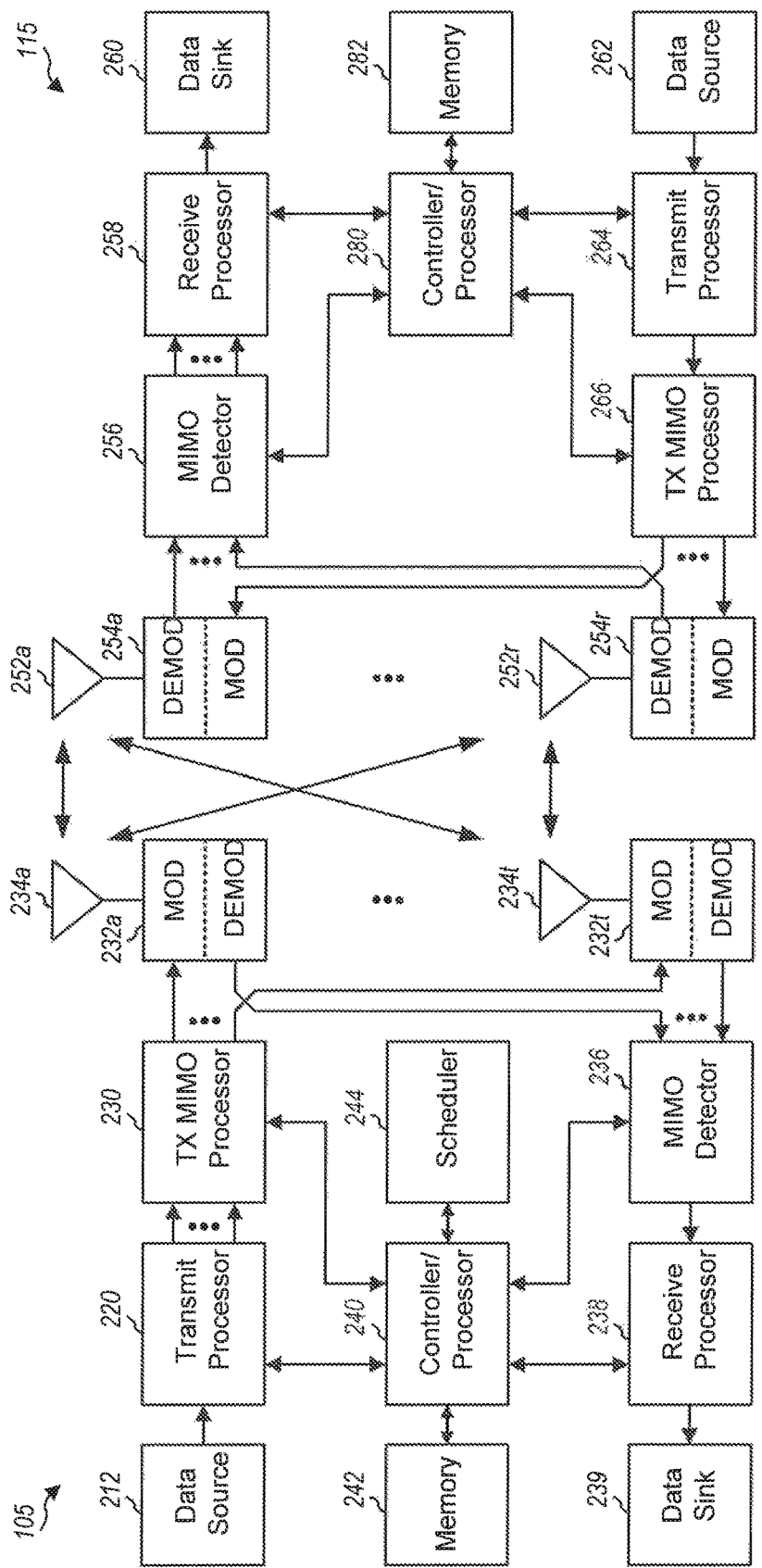
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 5A, 5B, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology is a communication technology that has been added to the LTE specifications in order to improve the performance of the system. This technology provides LTE with the ability to further improve its data throughput and spectral efficiency above that obtained by the use of OFDM. The basic concept of MIMO uses the multipath signal propagation that is present in terrestrial communications. Rather than providing interference, these paths can be used to advantage. The transmitter and receiver typically have more than one antenna and, using the processing power available at either end of the link, are able to use the different paths between the two entities to provide improvements in the data rate of signal to noise.

MIMO communication systems may be provisioned as single-user MIMO (SU-MIMO) or multi-user MIMO (MU-MIMO). In SU-MIMO systems, the eNB communicates with only one UE at any given time. In contrast, the eNB in a MU-MIMO system is able to communicate with multiple UEs at once. SU-MIMO and MU-MIMO systems are two possible configurations for multi-user communication systems. These systems may be able to achieve the overall multiplexing gain obtained as the minimum value between the number of antennas at base stations and the number of antennas at users. The fact that multiple users may simultaneously communicate over the same spectrum improves the system performance. Nevertheless, MU-MIMO networks are exposed to strong co-channel interference which is not the case for SU-MIMO networks. MU-MIMO systems address such interference using various interference management techniques including techniques based on beamforming. The beamforming of MU-MIMO systems benefits from channel state information (CSI) feedback of the serviced UEs.

An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 1.0, 20, 40, 80 ms, or the like. A UE may report CSI at CSI reporting instances also configured by the eNB. As a part of CSI reporting the UE generates and reports channel quality indicator (CQI), preceding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

MU-MIMO systems may be implemented with eNBs configured with lower-order antennas arrays (e.g., $N_T \leq 8$) or with higher-order or "massive" antennas arrays (e.g., $N_T \geq 8$), where $N_T$ represents the number of transmit antennas of the eNB. In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
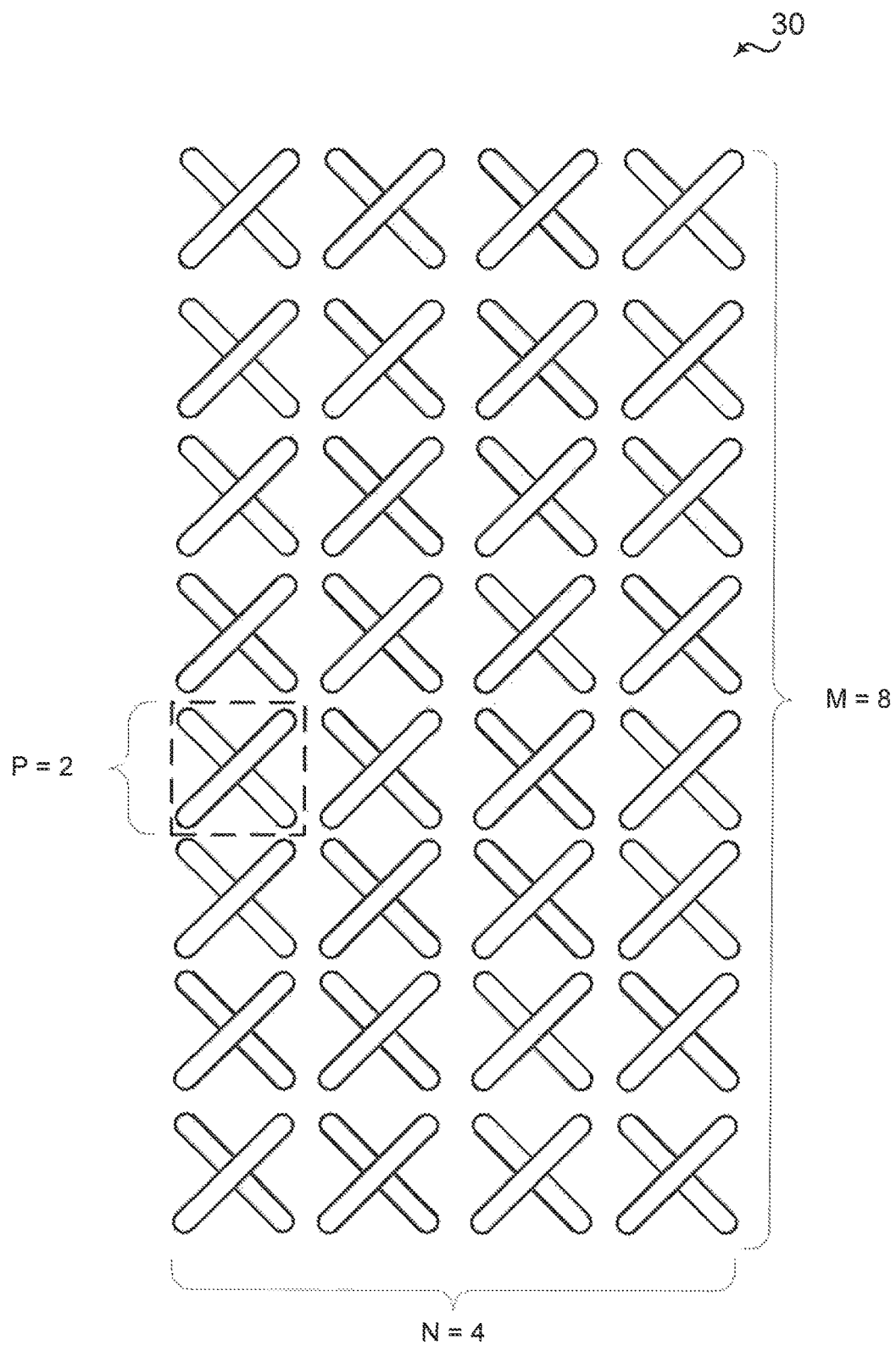
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2). For a 2D array structure, in order to exploit the vertical dimension by elevation beamforming the CSI is used at the base station. The CSI, in terms of PMI, RI, and CQI, can be fed back to the base station by a mobile station based on downlink channel estimation and predefined FM codebook(s).

As higher order MIMO systems arise and the demand for high throughput devices increases, the initial tendency for hardware companies is to simply increase the number of receivers in a device to support the higher order MIMO systems (e.g. 4×4, 8×8, etc.), However, supporting a large number of receiver chains having a very high radio frequency (RF) performance (e.g., blocking of signals from adjacent channels) in a phone form factor device includes a high degree of complexity due to the large number of filters that would be used to ensure the high RF performance. The complexity of such receivers could be reduced, and, by implication, the over cost of the device may be reduced, if some of RF filters and components are removed. However, without such RF components, the RF performance would suffer because of the signals coming in from adjacent channels which would not be filtered out.

Figure 4:
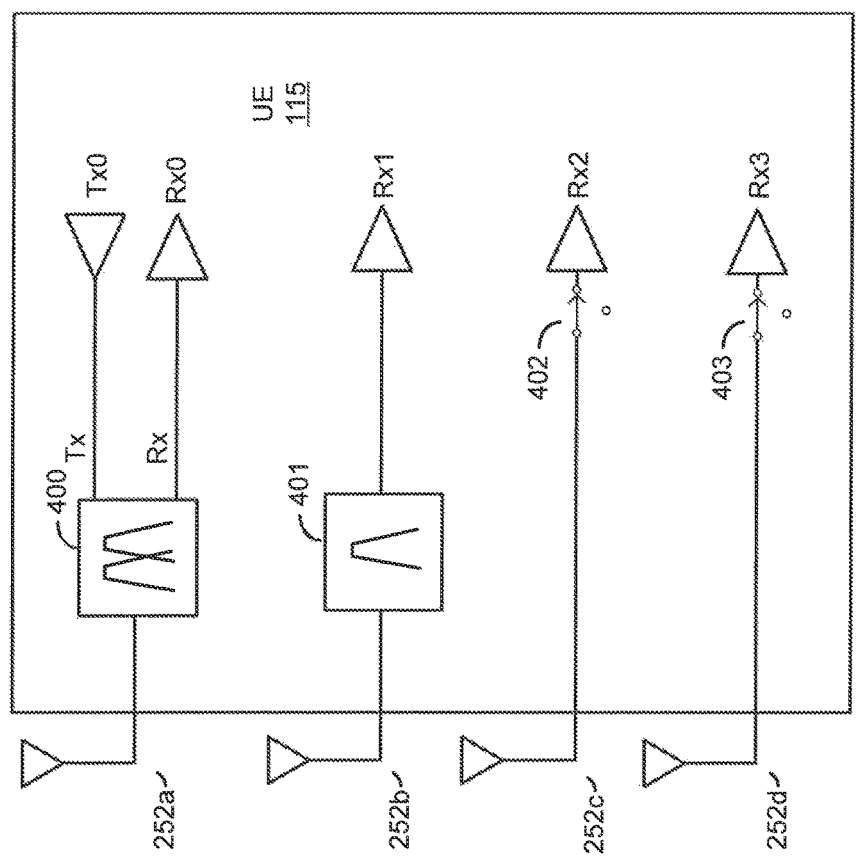
FIG. 4 is a block diagram illustrating a UE including two normal performance, high complexity receivers, and two low performance, low complexity receivers.

FIG. 4 is a block diagram illustrating a UE 115 including two normal-performance, high-complexity receivers, receiver 0 (Rx0), which also has transmission capabilities via transmitter (Tx0), and diversity receiver 1 (Rx1), and two low-performance, low-complexity diversity receivers, diversity receiver 2 (Rx2), and diversity receiver 3 (Rx3). The high-complexity receivers, Rx0 and Rx1, include filters 400 and 401, which may filter transmission noise that leaks into the receive paths of Rx0 and Rx1 via antennas 252a and 252b. Filter 400 includes a transmission passband for transmission of signals from transmitter Tx0, and a receive passband for receiving signals via Rx0, while filter 401 includes the single receive passband for receiving signals via Rx1 The low-complexity receivers, Rx2 and Rx3, do not include any filters in the receive chain with antennas 252c and 252d. Therefore, any stray signals that leak into the received signal path may be injected as interference into the received signal, UE 115 may also deactivate the low-complexity receivers, Rx2 and Rx3, by actuating switch 402 or 403, respectively, Deactivating Rx2 and Rx3 may save power at UE 115 when the interference is too great and decoding received signals becomes too resource expensive. Receivers Rx1-Rx3 are diversity receivers used along with Rx0 to increase decoding accuracy and efficiency.

The largest new interference that will likely limit the performance of such devices with low-complexity diversity receivers, such as UE 115 as illustrated in FIG. 4, may be the transmission signal noise from Tx0 that leaks into the receiver paths of the low-complexity diversity receivers. The leaking of this transmission signal noise may lead to the desensitization of the receiver of UE 115. As illustrated in FIG. 4, Rx0 and Rx1 are normal-performance receive paths with filters 400 and 401 that can reject or attenuate the transmission noise from Tx0. In the illustrated example, Rx2 and Rx3 are low-complexity receivers that do not have any filters and any leakage from transmissions via Tx0 and would be much higher. For example, considering transmissions via Tx0 at +28 dBm and an attenuation level at filter 400 of −55 dB, transmission based interference at Rx2 and Rx3 may approach −10 dBm compared with the filtered signal −27 dBm in Rx0 and, with an attenuation level of −40 dB at filter 401, for Rx1. The level of desensitization will, therefore, depend on the transmit power at a certain point in time. For example, when the transmit power is low enough, the extra diversity receivers, Rx2, Rx3, and the like, will be perfectly usable without any loss in performance.

It should be noted that the specific values used in the example described with respect to FIG. 4 are merely example values. Actual values for signal strength, attenuation level, or resulting filtered signal or interference level will depend on the components selected for any given implementation of UE. The various aspects of the present disclosure may be applicable to any variety of components and resulting values.

In order to effectively enable the use of the additional low-complexity diversity receivers, such as Rx2 and Rx3, (and, thus, enable higher order MIMO), uplink-downlink collisions at UE 115 should be minimized. An uplink-downlink collision occurs for a given UE when the UE transmits uplink signals and receives downlink signals in the same subframe. Various aspects of the present disclosure are directed to the network scheduling UE 115 in such a way that transmit and receive subframes do not overlap (in such implementation, the UE implicitly becomes a half-duplex UE). In the ideal scheduling, no uplink-downlink collisions would occur. However, the network will operate to schedule such transmissions to achieve a collision rate below a certain number of collisions. This number of collisions may be referred to as a minimum threshold number. If there are multiple UEs the network then the UEs can be multiplexed in different subframes resulting in little or no loss in terms of network capacity.

Figures 5A, 5B:
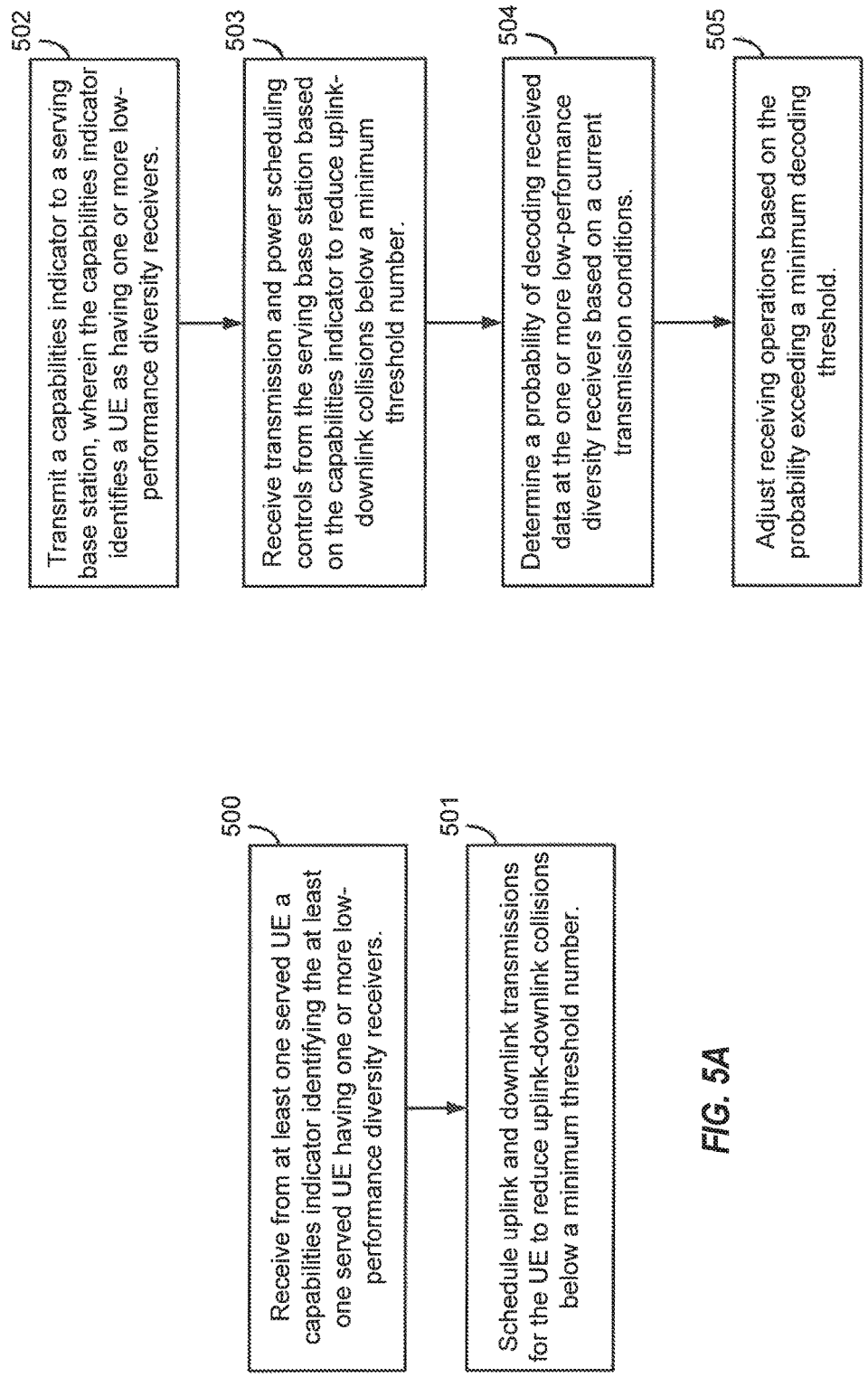
FIG. 5A is a block diagram illustrating example blocks executed by a base station to implement one aspect of the present disclosure.
FIG. 5B is a block diagram illustrating example blocks executed by a UE to implement one aspect of the present disclosure.
Figure 8:
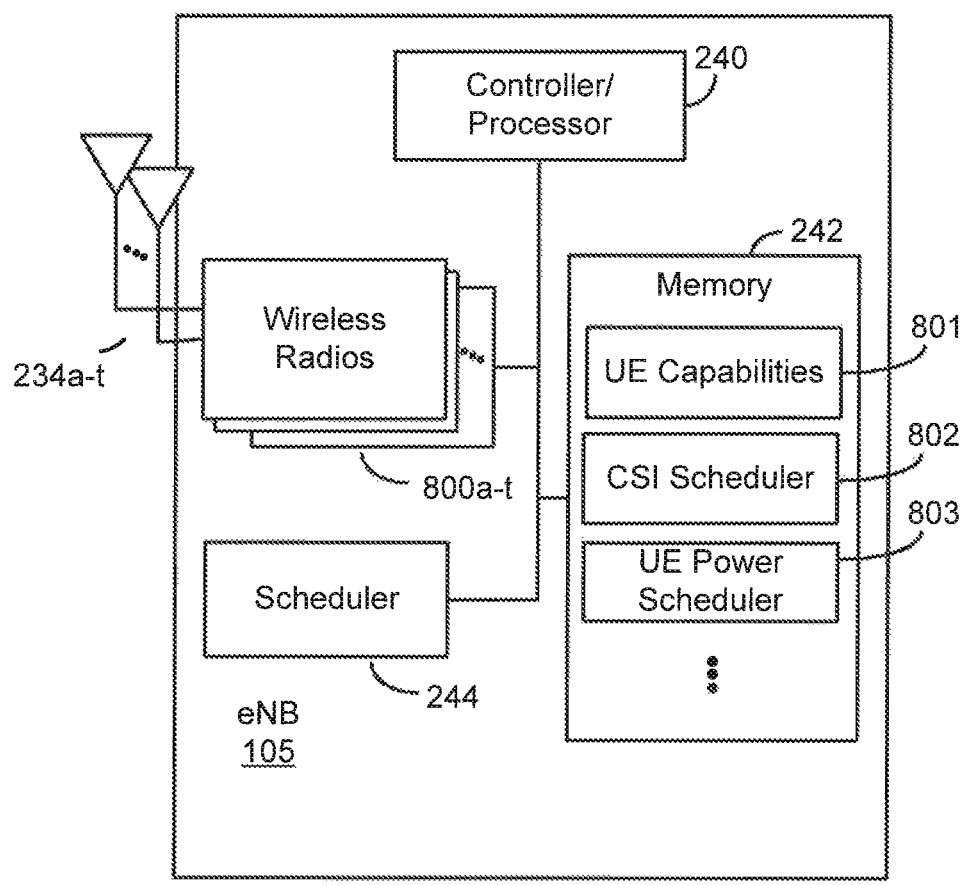
FIG. 8 is a block diagram illustrating an eNB configured according to one aspect of the present disclosure.

FIG. 5A is a block diagram illustrating example blocks executed by a base station to implement one aspect of the present disclosure. The example blocks will also be described with respect to eNB 105 as illustrated in FIG. 8. FIG. 8 is a block diagram illustrating eNB 105 configured according to one aspect of the present disclosure, eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105, eNB 105, under control of controller/processor 240, transmits and receives signals via wireless radios 800a-t and antennas 234a4. Wireless radios 800a-t includes various components and hardware, as illustrated in FIG. 2 for eNB 105, including modulator/demodulators 232a-t, MEMO detector 236, receive processor 238, transmit processor 220, and TX MIMO processor 230.

At block 500, a base station receives a capabilities indicator from at least one served UE identifying the UE as having one or more low-performance diversity receivers. For example, eNB 105 may receive a signal with a capabilities indicator from one of its served UEs. The capabilities indicator may include an indicator that the UE includes multiple low-complexity receivers, and may also include information such as the threshold maximum transmit power, which is the maximum transmit power for the UE that can be set which results in meeting a threshold interference (a maximum threshold interference) for the low-complexity receivers, such that any transmit power higher than the threshold maximum transmit power will cause too much interference at the low-complexity receivers. eNB 105 may store record of the capabilities indicator in memory 242 with UE capabilities 801.

At block 501, the base station schedules uplink and downlink transmissions for the UE to reduce uplink-downlink collisions to a minimum threshold number. For example, eNB 105, under control of controller/processor 240, controls scheduler 244 to plan uplink and downlink scheduling for the served UEs having low-complexity receivers, based on the capabilities information stored at UE capability 801. The uplink and downlink scheduling is determined to reduce any number of overlapping uplink and downlink occurrences, where both receiving and transmitting are occurring at the same time, to below a minimum threshold number. The minimum threshold number may be determined by an operator or may be based on the capabilities information, such as the power level, interference level of the low-complexity receivers, and the like, eNB 105 may then transmit the scheduling to the served UEs via wireless radios 700a-t and antennas 234a-t. The scheduling signals may be in various transmissions, such as downlink control information (DCI), uplink grants, and the like.

Figure 9:
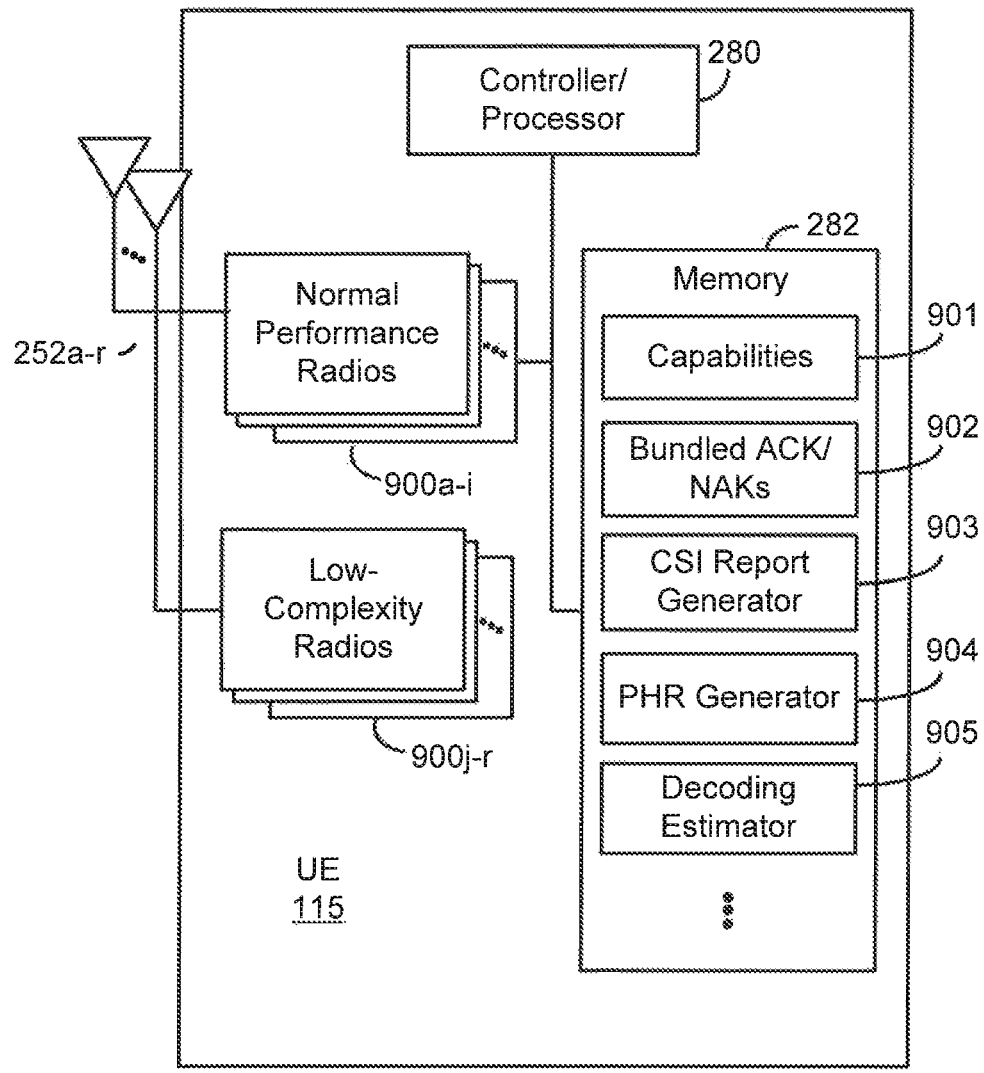
FIG. 9 is a block diagram illustrating a UE configured according to one aspect of the present disclosure.

FIG. 5B is a block diagram illustrating example blocks executed by a UE 115 to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via normal-performance radios 900a-i, low-complexity radios 900j-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 502, a UE transmits a capabilities indicator to a serving base station, wherein the capabilities indicator identifies the UE as having one or more low-performance diversity receivers. For example, UE 115 maintains its capabilities information at capability field 901, stored in memory 282. The capabilities indicator may include information that UE 115 includes low-complexity radios 900j-r, and may also include information such as the threshold maximum transmit power, and the like. Under control of controller/processor 280, UE 115 creates a capabilities indicator from the information in capability field 901 and transmits that capabilities indicator to a serving base station via normal performance radios 900*a-i*, low-complexity radios 900*j-r*, and antennas 252*a-r*.

At block 503, the LIE receives transmission and power scheduling controls from the serving base station based on the capabilities indicator to reduce uplink-downlink collisions to below a minimum threshold number. For example, UE 115 receives control scheduling information via normal performance radios 900*a-i*, low-complexity radios 900*j-r*, and antennas 252*a-r* and uses this information for configuring receiving and transmissions. The transmission and power scheduling controls may include scheduling parameters, such as DCI, uplink grants, rank, modulation coding scheme (MCS), transmit power control (TPC) commands, narrow resource block (RB) allocation, and the like, that controller/processor 280 may use to set the transmit power for transmission and to schedule reception of downlink transmissions and transmission of uplink transmissions. Additionally, the UE may receive scheduling for various reports (e.g., CQI, RI, PHR, etc.) depending on whether the transmission conditions, including uplink transmit power, number of collisions, and the like, would cause use or deactivation of use of the low-complexity radios 900*j-r*.

At block 504, the UE determines a probability of decoding received data at the low-performance diversity receivers based on current transmission conditions. For example, as signals are received at UE 115, controller/processor 280 executes decoding estimator logic 905, stored in memory 282, to determine a probability of successfully decoding the signals based on the current channel conditions at UE 115. The execution environment of decoding estimator logic 905 takes into consideration the level of interference detected as well as other channel conditions to determine the probability.

At block 505, the UE adjusts receiving operations based on the probability exceeding a minimum decoding threshold. For example, upon determining the probability of successfully decoding a received signal, UE 115, under control of controller/processor 280 compares the determined probability against a minimum decoding threshold. The minimum decoding threshold, which may be predetermined by an operator, or stored separately in memory 282, represents a level of probable success that results in efficient operations at UE 115. If the probability exceeds the minimum decoding threshold, which means that UE 115 may expend an extended period of time attempting to decode before sending a negative acknowledgement (NAK) or UE 115 knows that it is transmitting uplink signals at a high power during the same subframe as a scheduled downlink subframe, UE 115 may determine to adjust receiving operation. Adjusting receiving operations may include immediately determining that the signal cannot be decoded and transmitting a NAK to the serving base station. Alternatively, the adjusting may include switching low-complexity radios 900*j-r* off, in order to receive the signal only over normal performance radios 900*a-i*. By receiving the signals only over normal performance radios 900*a-i*, the beneficial filtering that occurs in normal performance radios greatly increases the probability of successfully decoding the received signals in an efficient manner.

Figure 6:
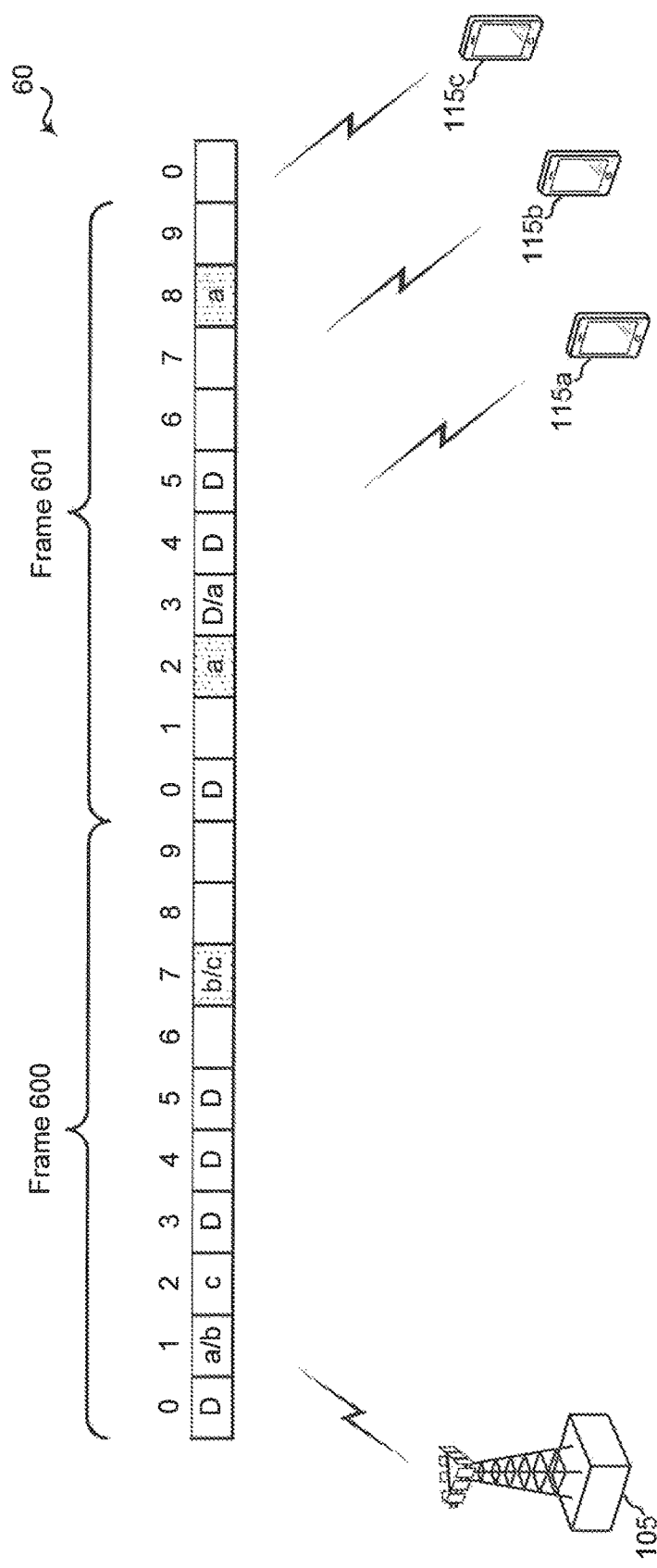
FIG. 6 is a block diagram illustrating a transmission stream between an eNB and UEs, each configured according to one aspect of the present disclosure.

FIG. 6 is a block diagram illustrating a transmission stream 60 between an eNB 105 and UEs 115*a-c*, each configured according to one aspect of the present disclosure. UEs 115*a-c* transmit capabilities indicators to eNB 105 to identify that each of UEs 115*a-c* include one or more low-complexity receiver chains. For example, at subframe 1 of frame 600, UEs 115*a* and 115*b* communicate their capabilities indicator to eNB 105, while UE 115*c* communicates its capabilities indicator at subframe 2 of frame 600.

Upon receipt of the capabilities indicators, eNB 105 may schedule the uplink and downlink communications for UEs 115*a-c* attempting to minimize any uplink-downlink collisions to a minimum threshold number. eNB 105 multiplexes uplink communications for UE 115*b* and 115*c* at subframe 7 of frame 600. The multiplexed uplink communications allows eNB 105 to maintain the overall traffic capacity of its coverage area.

According to current LTE standards, a downlink transmission may be followed by uplink transmission of an acknowledgement (ACK/NAK) for the downlink transmission 4 ms later. In order to minimize the number of uplink transmissions, which may, in turn, reduce the number of potential uplink-downlink collisions, multiple ACK/NAKs corresponding to multiple downlink subframes may be bundled together and sent at the same time, with uplink control signals (e.g., channel quality indicator (CQI), sounding reference signals (SRS), rank indicator (RI), precoding matrix indicator (PMI), etc.). Thus, when receiving downlink signals at subframes 4 and 5 of frame 600 and subframe 0 of frame 601, UE 115*a* may hold and bundle the ACK/NAKs for transmission together. Moreover, if UE 115*a* knows it has been scheduled with an uplink grant a few subframes later, it may also transmit the ACK/NAKs during the uplink granted subframe in order to minimize the probability of uplink-downlink collision. For example, UE 115*a* receives an uplink grant for subframe 2 of frame 601. Accordingly, at subframe 2 of frame 601, UE 115*a* transmits the bundled ACK/NAK to the serving base station. In the context of UE 115 of FIG. 9, UE 115 stores the multiple acknowledgments at bundled ACK/NAK 902 in memory 282. When the appropriate subframe has been reached for uplink transmission, UE 115, under control of controller/processor 280 retrieves the bundled ACK/NAKs from bundled ACK/NAK, 902 and transmits them to the serving base station via normal performance radios 900*a-i*, low-complexity radios 900*j-r*, and antennas 252*a-r*.

The signal to interference plus noise ratio (SINR) on the lower complexity receivers, Rx2 and Rx3 (FIG. 4) or low complexity radios 900*j-r* (FIG. 9), will likely be very different in different subframes depending on whether UE 115 has performed simultaneous transmit and receive or is just receiving downlink transmissions in that subframe. As such, eNB 105 (FIG. 8), under control of controller/processor 240, executes CSI scheduler 802, in memory 242, to schedule multiple CSI feedback operations for UE 115. UE 115, under control of controller/processor 280, executes CSI report generator logic 903, in memory 282, to prepare the CSI reports based on measurements and estimates performed on both subframes in which uplink-downlink collisions have occurred, and subframes when only downlink has occurred. As illustrated by communication stream 60, UR 115*a* measures CSI for subframe 3 of frame 601 where UE 115*a* both received downlink communications and transmitted uplink communications, and measures CSI for subframe 5 of frame 601 where UE 115*a* only received downlink communications. UE 115*a* may then report two separate CSI feedbacks (CQI, rank indicator, precoding matrix), one for the subframe with uplink-downlink collisions and one for the subframe with only downlink receiving. Since the network knows if, in a subframe, there will be simultaneous transmit and receive collisions or not, it can schedule UE 115*a* according to the appropriate feedback.

If the transmit power of UE 115 is below a certain level, then the impact on the receivers will be limited. The network could, therefore, schedule UE 115 in such a way as to minimize the uplink transmit power. For example, using the threshold maximum transmit power within the capabilities information from UE capabilities 801, eNB 105, under control of controller/processor 240, executes UE power scheduler 803 to generate various transmit power control signals or scheduling parameters to UE 115. Such signals may include rank, MCS, TPC or the like that. UE 115 may then use these power scheduling signals to set transmit power at a level that does not cause interference on the low-complexity receivers Rx2 and Rx3 (FIG. 4) or low-complexity radios 900j-r (FIG. 9) to exceed the maximum threshold interference.

Figure 7:
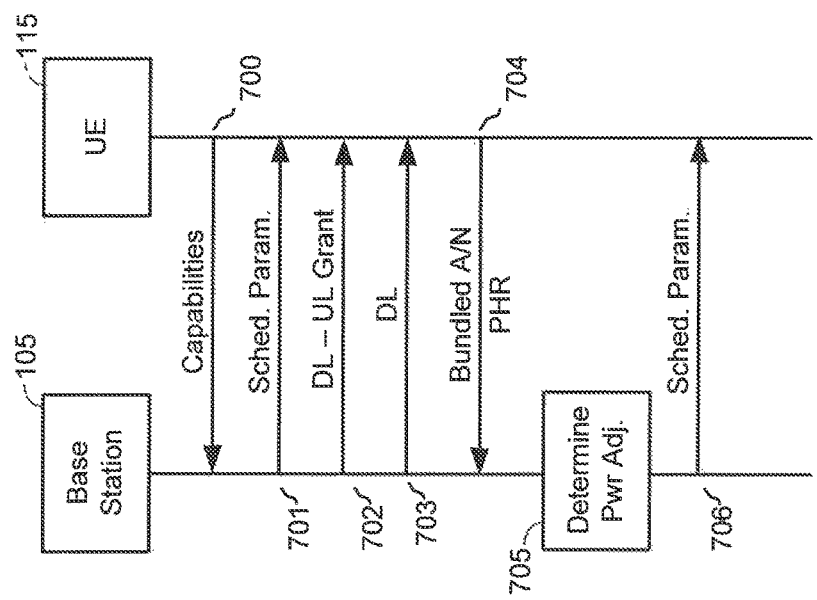
FIG. 7 is a call flow diagram illustrating a communication session between a base station and a UE configured according to one aspect of the present disclosure.

FIG. 7 is a call flow diagram illustrating a communication session between a base station 105 and a UE 115 configured according to one aspect of the present disclosure. UE 115 transmits a capabilities indicator to base station 105 at 700. The capabilities indicator identities that UE 115 includes low-complexity receivers and also may include information on the threshold maximum transmit power for UE 115, above which any transmissions from UE 115 will cause interference to the low-complexity receivers exceeding the maximum threshold interference.

At 701, base station 105 transmits various scheduling parameters to UE 115 based on the capabilities indicator received from UE 115. As discussed above, scheduling parameters may include uplink and downlink scheduling, such as DCI, uplink grants, and the like, but may also include power scheduling signals, such as rank, MCS, RB allocation, TPC, and the like. Scheduling parameters may also include scheduling of various transmission and power reporting, such as CQI, RI, power headroom report (PHR), and the like, based on whether transmission or power conditions allow for use of the low-complexity receivers according to the capabilities of UE 115. At 702, base station 105 transmits downlink information and an uplink grant to UE 115. Instead of sending individual ACK/NAKs, UE 115 bundles acknowledgments and identifies the subframe with the uplink grant as the subframe for transmitting the bundled ACK/NAK. Base station 105 transmits additional downlink information at 703. At 704, during the subframe in which UE 115 has an uplink grant, it transmits the bundled ACK/NAK and also transmits a power headroom report (PHR) to base station 105.

Using the PHR from UP 115, base station 105 determines the actual transmit power level at UE 115 using the knowledge of the total maximum transmit power, based on the power class of UE 115. Base station 105 compares the actual transmit power level at UE 115 to the threshold maximum transmit power and determines, at 705, whether to adjust any of the scheduling parameters affecting transmit power. In the illustrated example of FIG. 7, the actual power at UP 115 exceeds the threshold maximum transmit power. Therefore, base station 105 determines to send adjusted scheduling parameters at 706, which may reduce the transmit power of UE 115 to allow use of the low-complexity receivers.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving from at least one served user equipment (UE) a capabilities indicator identifying the at least one served UE having one or more low-complexity diversity receivers, wherein each low-complexity diversity receiver of the one or more low-complexity diversity receivers has at least one receive chain with at least one antenna, and wherein the at least one receive chain of each low-complexity diversity receiver is configured without a filter;
determining a minimum threshold number of uplink-downlink collisions, the minimum threshold number indicating a maximum number of acceptable uplink-downlink collisions; and
scheduling uplink and downlink transmissions for the at least one UE obtain an uplink-downlink collision rate below the minimum threshold number, wherein the scheduling is performed in response to the capabilities indicator.

2. The method of claim 1, wherein the scheduling avoids all uplink-downlink collisions.

3. The method of claim 1, further including:
bundling a plurality of acknowledgement messages into a single transmission instance for an uplink subframe, wherein the plurality of acknowledgement messages are associated with downlink transmissions in one or more downlink subframes; and
transmitting the single transmission instance in the uplink subframe.

4. The method of claim 3, further including:
receiving one or more uplink grants from the serving base station;
selecting one or more uplink subframes associated with the one or more uplink grants for the transmitting the single transmission instance.

5. The method of claim 1, further including:
scheduling the at least one served UE for a first channel state information (CSI) feedback operation during subframes having an uplink-downlink collision;
scheduling the at least one served UE for a second CSI feedback operation during subframes having downlink-only receiving; and
receiving CSI feedback associated with one or more of: the first CSI feedback operation and the second CSI feedback operation.

6. The method of claim 5, further including:
adjusting one or more scheduling parameters for the at least one served UE based on the CSI feedback.

7. The method of claim 1, further including:
obtaining a threshold maximum transmit power for the at least one served UE above which the one or more low-complexity diversity receivers at the at least one served UE experience a maximum threshold interference; and
selecting one or more scheduling parameters for the at least one served UE, wherein the selected one or more scheduling parameters are selected to remain below the threshold maximum transmit power at the at least one UE.

8. The method of claim 7, further including:
receiving a power headroom report from the at least one served UE;
determining transmit power level at the at least one served UE based on the power headroom report;
comparing the determined transmit power level against the threshold maximum transmit power, wherein the selecting the one or more scheduling parameters is based at least in part on results of the comparing.

9. The method of claim 1, further including:
obtaining a threshold maximum transmit power for the at least one served UE above which the one or more low-complexity diversity receivers at the at least one served UE experience a maximum threshold interference;
scheduling one or more first reports from the at least one served UE associated with one or more of: transmission and power, when an uplink transmit power of the at least one served UE is above the threshold maximum transmit power; and
scheduling one or more second reports from the at least one served UE associated with the one or more of: transmission and power, when the uplink transmit power of the at least one served UE is below the threshold maximum transmit power.

10. A method of wireless communication, comprising:
transmitting a capabilities indicator by a user equipment (UE) to a serving base station, wherein the capabilities indicator identifies the UE as having one or more low-complexity diversity receivers, wherein each low-complexity diversity receiver of the one or more low-complexity diversity receivers has at least one receive chain with at least one antenna, and wherein the at least one receive chain of each low-complexity diversity receiver is configured without a filler; and receiving transmission and power scheduling controls from the serving base station based on the capabilities indicator to reduce uplink-downlink collisions below a minimum threshold number the minimum threshold number indicating a maximum number of acceptable uplink-downlink collisions.

11. The method of claim 10, further including:
determining a probability of decoding received data at the one or more low-complexity diversity receivers based on a current transmission condition at the UE; and
adjusting receiving operation based on the probability exceeding a minimum decoding threshold.

12. The method of claim 11, wherein the adjusting receiving operations includes one of:
decoding the received data using one or more high-performance receivers at the UE while powering down the one or more low-complexity diversity receivers; or
refraining from decoding the received data and transmitting a negative acknowledgment to the serving base station.

13. The method of claim 10, further including:
receiving, from the serving base station, scheduling of one or more first reports associated with one or more of: transmission and power, when an uplink transmit power exceeds a threshold maximum power where the one or more low-complexity diversity receivers experience maximum threshold interference; and
receiving, from the serving base station, scheduling of one or more second reports associated with the one or more of: transmission and power, when the uplink transmit power is below the threshold maximum power.

14. An apparatus configured for wireless communication, the apparatus comprising:
at least one processor; and
a memory coupled to the at least one processor,
wherein the at least one processor is configured:
to receive from at least one served user equipment (UE) a capabilities indicator identifying the at least one served UE having one or more low-complexity diversity receivers, wherein each low-complexity diversity receiver of the one or more low-complexity diversity receivers has at least one receive chain with at least one antenna, and wherein the at least one receive chain of each low-complexity diversity receiver is configured without a filter;
to determine a minimum threshold number of uplink-downlink collisions, the minimum threshold number indicating a maximum number of acceptable uplink-downlink collisions; and
to schedule uplink and downlink transmissions for the at least one UE to obtain an uplink-downlink collision rate below the minimum threshold number, wherein the configuration of the at least one processor to schedule is executed in response to the capabilities indicator.

15. The apparatus of claim 14, wherein the configuration of the at least one processor to schedule avoids all uplink-downlink collisions.

16. The apparatus of claim 14, further including configuration of the at least one processor:
to bundle a plurality of acknowledgement messages into a single transmission instance for an uplink subframe, wherein the plurality of acknowledgement messages are associated with downlink transmissions in one or more downlink subframes; and
to transmit the single transmission instance in the uplink subframe.

17. The apparatus of claim 16, further including configuration of the at least one processor:
to receive one or more uplink grants from the serving base station;
to select one or more uplink subframes associated with the one or more uplink grants for the configuration of the at least one processor to transmit the single transmission instance.

18. The apparatus of claim 14, further including configuration of the at least one processor:
to schedule the at least one served UE for a first channel state information (CSI) feedback operation during subframes having an uplink-downlink collision;
to schedule the at least one served UE for a second CSI feedback operation during subframes having downlink-only receiving; and
to receive CSI feedback associated with one or more of: the first CSI feedback operation and the second CSI feedback operation.

19. The apparatus of claim 18, further including configuration of the at least one processor to adjust one or more scheduling parameters for the at least one served UE based on the CSI feedback.

20. The apparatus of claim 14, further including configuration of the at least one processor:
to obtain a threshold maximum transmit power for the at least one served UE above which the one or more low-complexity diversity receivers at the at least one served UE experience a maximum threshold interference; and
configuration of the at least one processor to select one or more scheduling parameters for the at least one served UE, wherein the selected one or more scheduling parameters are selected to remain below the threshold maximum transmit power at the at least one UE.

21. The apparatus of claim 20, further including configuration of the at least one processor:
to receive a power headroom report from the at least one served UE;
to determine transmit power level at the at least one served UE based on the power headroom report;
to compare the determined transmit power level against the threshold maximum transmit power, wherein the configuration of the at least one processor to select the one or more scheduling parameters is based at least in part on results of the configuration to compare.

22. The apparatus of claim 14, further including configuration of the at least one processor:
to obtain a threshold maximum transmit power for the at least one served UE above which the one or more low-complexity diversity receivers at the at least one served UE experience a maximum threshold interference;
to schedule one or more first reports from the at least one served UE associated with one or more of: transmission and power, when an uplink transmit power of the at least one served UE is above the threshold maximum transmit power; and
to schedule one or more second reports from the at least one served UE associated with the one or more of:

transmission and power, when the uplink transmit power of the at least one served UE is below the threshold maximum transmit power.

23. An apparatus configured for wireless communication, the apparatus comprising:
    at least one processor; and
    a memory coupled to the at least one processor,
    wherein the at least one processor is configured:
        to transmit a capabilities indicator by a user equipment (UE) to a serving base station, wherein the capabilities indicator identifies the UE as having one or more low-complexity diversity receivers, wherein each low-complexity diversity receiver of the one or more low-complexity diversity receivers has at least one receive chain with at least one antenna, and wherein the at least one receive chain of each low-complexity diversity receiver is configured without a filter; and
        to receive transmission and power scheduling controls from the serving base station based on the capabilities indicator to reduce uplink-downlink collisions below a minimum threshold number the minimum threshold number indicating a maximum number of acceptable uplink-downlink collisions.

24. The apparatus of claim 23, further including configuration of the at least one processor:
    to determine a probability of decoding received data at the one or more low-complexity diversity receivers based on a current transmission condition at the UE; and
    to adjust receiving operation based on the probability exceeding a minimum decoding threshold.

25. The apparatus of claim 24, wherein the configuration of the at least one processor to adjust receiving operations includes configuration of the at least one processor to one of:
    decode the received data using one or more high-performance receivers at the UE while powering down the one or more low-complexity diversity receivers; or
    refrain from decoding the received data and transmit a negative acknowledgment to the serving base station.

26. The apparatus of claim 23, further including configuration of the at least one processor:
    to receive, from the serving base station, scheduling of one or more first reports associated with one or more of: transmission and power, when an uplink transmit power exceeds a threshold maximum power where the one or more low-complexity diversity receivers experience maximum threshold interference; and
    to receive, from the serving base station, scheduling of one or more second reports associated with the one or more of: transmission and power, when the uplink transmit power is below the threshold maximum power.

* * * * *